United States Patent [19]

O'Dwyer et al.

[11] Patent Number: 4,824,926

[45] Date of Patent: Apr. 25, 1989

[54] BILAYER WINDSHIELD WITH AN ABRASION AND SOLVENT RESISTANT POLYURETHANE PROTECTIVE COATING

[75] Inventors: James B. O'Dwyer, Valencia; Wen-Hsuan Chang; Roger L. Scriven, both of Gibsonia; Joseph Cherenko, Valencia, all of Pa.

[73] Assignee: PPG Industries, Inc., Pittsburgh, Pa.

[21] Appl. No.: 133,830

[22] Filed: Dec. 16, 1987

[51] Int. Cl.$^4$ .............................................. C08G 18/00
[52] U.S. Cl. ........................................ 528/65; 528/66; 528/76; 528/80
[58] Field of Search ........................ 528/65, 66, 76, 80

[56] References Cited

U.S. PATENT DOCUMENTS

| | | | |
|---|---|---|---|
| 2,047,253 | 7/1934 | Brooks | 296/84 |
| 2,184,876 | 6/1936 | Sherts | 49/92 |
| 3,781,184 | 12/1973 | Domicone et al. | 161/165 |
| 3,806,387 | 4/1974 | Peetz et al. | 156/102 |
| 3,808,077 | 4/1974 | Rieser et al. | 156/102 |
| 3,900,673 | 8/1975 | Mattimoe et al. | 428/339 |
| 3,916,074 | 10/1975 | Knackstedt et al. | 428/425 |
| 3,958,245 | 5/1976 | Cherenko et al. | 343/713 |
| 3,979,548 | 9/1976 | Schafer et al. | 428/425 |
| 4,039,720 | 8/1977 | Cherenko et al. | 428/425 |
| 4,059,469 | 11/1977 | Mattimoe et al. | 156/108 |
| 4,112,171 | 9/1978 | Motter et al. | 428/213 |
| 4,174,240 | 11/1979 | Muller et al. | 156/99 |
| 4,232,080 | 11/1980 | Orain et al. | 428/215 |
| 4,242,403 | 12/1980 | Mattimoe et al. | 428/213 |
| 4,584,229 | 4/1986 | Bourelier et al. | 428/216 |
| 4,600,653 | 7/1986 | Washita et al. | 428/425 |
| 4,609,688 | 9/1986 | Radisch et al. | 523/169 |
| 4,643,944 | 2/1987 | Agethen et al. | 428/349 |

Primary Examiner—Maurice J. Welsh
Attorney, Agent, or Firm—Donna L. Seidel

[57] ABSTRACT

An abrasion and solvent resistant polyurethane protective coating for bilayer windshields is formulated by the reaction of a polyester or polyether diol with an aliphatic isocyanate-terminated prepolymer.

10 Claims, No Drawings

BILAYER WINDSHIELD WITH AN ABRASION AND SOLVENT RESISTANT POLYURETHANE PROTECTIVE COATING

FIELD OF THE INVENTION

The present invention relates generally to the art of safety glass windshields and particularly to the art of providing bilayer safety glass windshields with abrasion resistant coatings.

THE PRIOR ART

Safety glass commonly describes a glass-plastic laminate designed to reduce the severity of lacerative injuries resulting upon impact sufficient to break the glass. A plastic film is laminated to a glass sheet so that upon impact sufficient to break the glass, the film adheres to the glass fragments, minimizing their dispersion. To be useful as safety glass, a laminate must have high energy absorption to minimize concussive injuries upon impact, high tensile and tear strength to prevent rupture of the film by glass fragments, sufficient adhesion between the layers to reduce lacerative injuries by minimizing the dispersion of glass fragments, and high optical quality. Moreover, the safety glass laminate must retain these properties over a wide range of temperature and humidity conditions.

Commercially employed safety glass, particularly in automobile windshields, is commonly a multiple laminate of two plies of glass with an interlayer of plasticized polyvinyl butyral. An alternative to this trilayer type of safety glass laminate is a bilayer laminate having a single ply of glass with a plastic innerlayer. Upon impact sufficient to break the glass in a bilayer windshield, the danger from glass fragments inside the passenger compartment is greatly reduced because there is no interior glass ply. However, since the innerlayer is not protected by an interior glass ply, the plastic film must have good weathering properties, chemical stability, and abrasion resistance, to provide durability for the requisite safety and optical quality.

Thermoset polymer films are generally durable, but are difficult to laminate and may be sufficiently rigid that concussive injuries are not sufficiently abated. Thermoplastic polymer films are energy-absorbent and relatively easy to laminate, but are often solvent sensitive and thus easily scratched, resulting in deterioration of optical quality. U.S. Pat. No. 4,039,720 to Cherenko et al provides an improved bilayer safety glass by combining the desirable properties of both thermoset and thermoplastic polymers in an innerlayer of thermoplastic polymer with its exposed surface crosslinked.

Other safety glass laminates are known which combine desirable properties by combining two or more plastic films. For example, U.S. Pat. No. 2,047,253 to Brooks shows a safety glass laminate comprising a glass ply, a cellulose nitrate or acetate innerlayer and a hard coating of phenolic resin. U.S. Pat. No. 2,184,876 to Sherts discloses a laminate of glass, plasticized polyvinyl butyral and unplasticized polyvinyl butyral. U.S. Pat. No. 3,781,104 to Domicone et al relates to a windshield having a glass outer layer, a soft polyvinyl butyral innerlayer and a protective layer of polyvinyl fluoride.

U.S. Pat. No. 3,806,387 to Peetz et al teaches a method for making a composite glazing of a glass sheet, a layer of polyvinyl butyral and a sheet of cellulose acetobutyrate. The cellulose acetobutyrate sheet may be coated on one side with a layer of slightly reticulated aliphatic polyurethane which is elastically deforming during lamination to prevent optical defects from forming in the plastic cellulose acetobutyrate sheet. U.S. Pat. No. 3,916,074 to Knackstedt et al discloses a glass laminate including an amorphous polyamide layer which is covered with a lacquer which may be the reaction product of an isocyanate and a hydroxy-containing polyester.

In U.S. Pat. No. 3,958,245 to Cherenko et al and U.S. Pat. No. 3,808,077 to Rieser et al, it is disclosed that the polyvinyl butyral layer of a bilayer windshield may be protectively coated with a thin layer of polyurethane which may be the reaction product of an organic polyisocyanate and a hydroxyl-terminated polyester.

U.S. Pat. No. 3,979,548 to Schafer et al discloses a scratch-resistant polyurethane coating for safety windows which is made by curing a sheet of a liquid composition comprising (1) a polyglycol ether resulting from the condensation of propylene oxide with trimethylolpropane and (2) a biuret of 1,6 hexamethylene diisocyanate.

U.S. Pat. No. 3,900,673 to Mattimoe et al discloses an automobile windshield that incorporates as part of its laminated structure a protective laceration inhibiting cover or shield bonded to its inboard glass surface combining a penetration resisting high adhesion plastic such as polyvinylbutyral, ionomer resin, polyurethane and polyvinylchloride, and a relatively harder abrasion resistant coating selected from the group consisting of (a) mixtures of polysalicic acid and copolymers of fluorinated monomers with compounds containing alcohol groups and (b) hydrolysis and condensation products of methyltriethoxysilane.

U.S. Pat. No. 4,059,469 to Mattimoe et al discloses a similar automobile glazing structure further comprising an adhesion promoting Primer which is the reaction product of a film forming resin and a compound capable of hydrolysis followed by condensation.

U.S. Pat. No. 4,112,171 to Motter et al discloses a transparent glazing structure comprising a glass substrate; a layer of soft, extensible, penetration-resistant plastic; a thinner layer of a more durable plastic; an abrasion-resistant coating of a cured organopolysiloxane compound, and an exposed surface on said coating that has been silane catalyzed before curing to impart the highest degree of cure to the exposed surface and to render said coating progressively harder outwardly through its thickness toward said exposed surface.

U.S. Pat. No. 4,174,240 to Muller et al discloses polyurethane polyureas for lamination of glazing materials.

U.S. Pat. No. 4,232,080 to Orain et al discloses a safety glass window comprising a sheet of glass, an llastic plastic layer adhered to the interior surface of the glass, said interior elastic plastic layer being transparent and antilacerative and self-healing.

U.S. Pat. No. 4,242,403 to Mattimoe et al discloses a multilayer autmotive glazing unit comprising transparent substrates with protective covers or shields over surfaces of the substrates that combine penetration resistant body portions with exposed abrasion resistant surfaces of the silica reinforced organopolysiloxene compound and methods of producing such units.

U.S. Pat. No. 4,584,229 to Bourelier et al discloses a glazing laminate comprised of a first lastic layer having energy absorbing properties and a second plastic layer comprised of thermoset polyurethane having antilacertive and self-healing properties, said first layer formed from a reaction mixture including a thermoplastic polyurethane polyurea containing about 1 to 20 percent by weight urea groups and at least one polyisocyanate having NCO functionality greater than 2.

U.S. Pat. No. 4,600,653 to Washita et al discloses laminated safety glass comprising an inorganic glass layer and a synthetic resin layer characterized in that the major portion of the synthetic resin layer comprises a polyurethane type thermoplastic resin obtained from a high molecular weight diol composed of a combination of from 40 to 70 percent by weight of a poly 1,6 hexylene carbonate diol and from 30 to 60 percent by weight of a polyester diol, a chain extender and a non-yellowing diisocyanate compound.

U.S. Pat. No. 4,609,688 to Radisch et al discloses a transparent antifogging coating comprised of a plastic material, which may be employed as an external layer in a laminated pane, which is a highly elastic three dimensionally crosslinked layer comprised of at least one surface active agent disposed within its crosslink structure.

U.S. Pat. No. 4,643,944 to Agethen et al discloses vehicle windshields in which an energy absorbing ply is sandwiched in between two glass plies, and applied to the exposed surface of one of the glass plies is a sheet thermoset polyurethane having antilacerative, self-healing and antiablative properties, and having a thermoplastic polyurethane adhesive layer to adhere the thermoset polyurethane to the glass.

SUMMARY OF THE INVENTION

The present invention encompasses an abrasion-resistant branched polyurethane film, used as a protective coating for the exposed plastic surface of a bilayer safety glass laminate, prepared by the reaction of a isocyanate-terminated prepolymer and a linear polyol.

DESCRIPTION OF THE PREFERRED EMBODIMENTS

The protective coating of the present invention is preferably prepared by reacting a polyester triol with an organic diisocyanate, preferably an aliphatic diisocyanate, in an appropriate solvent to form an isocyanate-terminated prepolymer having a functionality greater than 2, then further reacting the trifunctional prepolymer with a linear polyol, preferably a polyester diol, to form a crosslinked polyurethane. Preferred isocyanates include methylene bis(cyclohexyl isocyanate), hexamethylene diisocyanate, trimethylhexane diisocyanate and isophorone diisocyanate. Preferred polyester triols are polycaprolactone triols having a molecular weight less than 1000. Preferred linear polyols preferably have a molecular weight between 300 and 5000, more preferably 500 to 2500, and include polyether diols, preferably with molecular weights around 1000 to 2000, and more preferably polycaprolactone diols, particularly with molecular weights of 300 to 2000, more preferably 500 to 1250. Keeping the molecular weights of the components relatively low provides polymers with relatively high urethane content as preferred in accordance with the present invention. Urethane content is expressed herein as weight percent nitrogen in the polymer, and includes nitrogen in urethane groups, urea groups and cyclic nitrogen. Preferred nitrogen content is in the range of 2 to 5.5 percent, more preferably 2.5 to 5 percent, and most preferably 3 to 4 percent.

In a preferred embodiment of the present invention, a triol and isocyanate are reacted in an appropriate solvent to form a branched isocyanate-terminated prepolymer solution which comprises the first component of a two-component coating composition. The second component is a linear polyol, preferably a polyester diol, preferably in the same or a compatible solvent. The two components are preferably combined immediately prior to applying the protective coating to the plastic innerlayer of a multilayer windshield. Various types of crosslinked polyurethanes, preferably comprising ring structures, such as from cycloaliphatic isocyanates, may be used as abrasion-resistant coatings in accordance with the present invention, preferably with a crosslink density, calculated as grams per mole of trifunctionality, between 1200 and 5000, preferably 1800 to 3200.

A branched polyester polyol may be reacted with a diisocyanate or triisocyanate in accordance with the present invention. Preferably, a polycaprolactone diol with a molecular weight of about 300 to 2000, more preferably about 500 to 1000, may be reacted with a branched triisocyanate. A polyether diol having a molecular weight of about 650 to 1000 may be reacted with a branched triisocyanate. A combination of a polycaprolactone diol and a monomeric diol may be reacted with a triisocyanate. Polyneopentylglycol adipate, as well as a poly 1-6 adipate diol, may be reacted with a triisocyanate. Polycaprolactone diols with molecular weight of about 300 to 2000, preferably 500 to 1000, may be reacted with a prepolymer formed from a triol, preferably a low molecular weight polyester triol, and a diiisocyanate. A polycaprolactone diol may be reacted with a mixture of diisocyanates and triisocyanates. Polycaprolactone diols may also be reacted with partially blocked isocyanates in accordance with present invention. The common features of the crosslinked polyurethanes of the present invention are the use of a low molecular weight polymeric polyol and a polyisocyanate wherein at least one of the components has a functionality greater than 2 to produce a branched polyurethane with high urethane content which provides solvent/abrasion resistance.

In an alternative embodiment, a diol may be reacted with a triisocyanate to form a branched hydroxy-terminated prepolymer as the first component which is then further reacted with an aliphatic diisocyanate as the second component to form the abrasion-resistant polyurethane coating of the present invention.

The molecular weight of the prepolymer components is preferably less than about 10,000, more preferably about 2000 or less. The molecular weight of the linear second component is preferably between 300 and 5000, more preferably between about 500 and 2000.

In a particularly preferred embodiment, the two components are mixed and immediately sprayed onto a surface of an elastomeric innerlayer sheet, preferably a thermoplastic polyurethane, which is then heated to remove the solvent and cure the resultant crosslinked polyurethane. The coated elastomer sheet is then assembled with the uncoated surface in contact with a surface of a glass sheet for lamination. A preferred lamination technique is described in U.S. Pat. No. 3,808,077, the disclosure of which is incorporated herein by reference.

In an alternative embodiment, the elastomeric innerlayer is first laminated to a glass sheet, and then the abrasion-resistant coating is applied. In one embodiment, the reaction mixture is applied to the exposed innerlayer surface, dried and thermally cured. In another, a film of the abrasion-resistant polyurethane is preformed and laminated to a glass/elastomer laminate. In yet another, the glass elastomer and a preformed coating are laminated simultaneously.

The polyester triols used in accordance with the present invention are preferably low molecular weight polylactone triols, particularly polycaprolactone triols having a molecular weight less than about 2000 made by ring opening epsilon-caprolactone with trimethylolpropane. The triol is added slowly to the organic isocyanate, preferably an aliphatic or cycloaliphatic diisocyanate, particularly 4,4'-methylene-bis(cyclohexyl isocyanate). An excess of isocyanate is present in an appropriate solvent such as xylene, ethylene glycol monoethylether acetate or a ketone, preferably methyl ethyl or methyl isobutyl ketone. The reaction between the polyester triol and the excess diisocyanate results in a branched isocyanate-terminated prepolymer in the solvent. This solution, preferably containing about 80 percent solids, forms the first component of a two-component coating composition.

The second component comprises a solution of a linear polyester or polyether diol which reacts with the branched isocyanate-terminated prepolymer and any excess isocyanate to form a cross-linked polyurethane. The second component preferably contains the same solvent present in the first component and about 60 percent of the polyester diol, which is preferably a polycaprolactone diol having a molecular weight less than about 3000. The ratio of isocyanate to hydroxl groups is preferably in he range of 0.8 to 1.2, more preferably in the range of 0.95 to 1.05. For spray applications of the coating composition, the two components are preferably diluted to about 5 to 50 percent solids.

The two component coating composition of the present invention is preferably sprayed onto a surface of an elastomeric thermoplastic innerlayer sheet such as polyvinylbutyral or polyurethane, preferably polyurethanes such as those disclosed in U.S. Pat. No. 3,931,113, the disclosure of which is incorporated herein by reference. For continuous, full scale production of coated innerlayer sheeting, knife coating, reverse roll coating or transfer coating may be preferred. The solvent is evaporated, and the coating composition is thermally cured. The time and temperature required for curing depend on the catalyst and its concentration. While high catalyst levels provide short cure times, short pot life also results. Conversely, to gain long pot life, low catalyst levels are used which result in longer cure times.

In some of the following examples, polyurethane reaction mixtures, typically about 70 percent solids, are applied by drawknife to an untreated float glass substrate. Wet film thicknesses are typically 12 to 20 mils (0.3 to 0.5 millimeter) thick. The solvent is evaporated, and the polymer is thermally cured. Dried and cured, the film thicknesses are typically about 0.7 times the wet film thickness. Such thicknesses are preferred to prevent damage in peeling the film from the glass and in handling the film for lamination. Much thinner films are sufficient to provide solvent/abrasion resistance. When the film is removed from the glass substrate, the surface of the film which was in contact with the glass will have an optically smooth appearance, although the surface exposed to the air may not be so uniform. To remove the film from the substrate, it may be necessary to soak the film in warm water in order to peel it from the glass without tearing. This warm water soak may be avoided by coating the glass substrate with a release agent before applying the polyurethane rection mixture. After the film is removed from the glass substrate, it is assembled with a glass/elastomer safety bilayer for lamination.

To apply a coating of the present invention by spraying, a reaction mixture is preferably diluted to about 5 to 50 percent solids. The composition may be sprayed onto a surface of an elastomeric innerlayer which is then laminated to a glass substrate, or the coating composition may be applied to the exposed surface of an elastomeric innerlayer already laminated to a glass substrate. In any case, coatings applied by spraying are preferably applied at a thickness of 0.5 to 2 mils (0.01 to 0.05 millimeter).

The elastomeric innerlayer may be any of the conventional energy-absorbing innerlayers, such as polyvinyl butyral, but is preferably a polyurethane. In the following examples, the innerlayer is a polyurethane prepared from butylene adipate diol and methylene bis(cyclohexyl isocyanate) as taught in U.S. Pat. No. 3,931,113 incorporated herein by reference. The glass-/elastomer/abrasion-resistant film assemblies of the following examples are laminated at 300° F. (about 149° C.) and 200 pounds per square inch pressure for 45 minutes.

After the samples cool to ambient temperature, they are subjected to abrasion testing using a sled abrader as follows. A sample measuring 2 by 4 inches (5.1 by 10.2 centimeters) is placed in a frame in a solvent pan. A felt pad measuring 1.5 by 1.5 inches (3.8 centimeters square) is placed on the sample and weighted with a 1.5 inch (3.8 centimeter) cast metal cube weighing 1.125 pounds (510 grams) resulting in a pressure of about 0.5 pound per square inch, which is equivalent to a typical hand surface area of 10 square inches wiping the interior of an automobile windshield with a force of 5 pounds. The felt pad and weight have a central hole for the introduction of loose abrasive powder (in contrast to fixed abrasive in the Taber abrasion test). The abrasive is sharp-edged synthetic Alundum at 400 mesh, the average particle size being 22.5 microns, sold by the Norton Co. as microgradded flour, which simulates dust.

While some dry abrasion testing has been done, results of abrasion with solvent more critically test the durability of the coating. In these examples, samples are abraded in the presence of acetone and isopropanol respectively. The weighted felt pad rubs the coated surface at 2 cycles per second for 500 cycles (1000 passes). Abrasion of the coated surface is visually evaluated as an estimate of the percent haze due to light scattering after abrasion on a scale of 1 to 100, 1 being the result for abraded glass with or without solvents and 100 being the result for uncoated acrylic in acetone. For comparison, results for uncoated thermoplastic polyurethane as used for the innerlayer in these examples are typically 80 with acetone and 60 with isopropanol. In the following examples, results are termed "good" if both solvents cause 20 percent haze or less, and "excellent" if both results are 10 or less.

The present invention will be further understood from descriptions of specific examples which follow.

EXAMPLE I

A polyether-based polyurethane is prepared from a reaction mixture comprising 76.5 grams of polytetramethylene ether glycol, 48.5 grams of polyisocyanate and 10.2 grams of catalyst solution. The polyol has a molecular weight of about 1000 and is available as Polymeg 1000 from Quaker Oats. The polyisocyanate is a branched polyisocyanate based on condensation of isophorone diisocyanate, contains isocyanurate groups and has a functionality between 3 and 4, and is commercially available as IPDIT-1890 from Veba-Chemie AG. The catalyst solution contains one percent dibutyltin dilaurate in methyl ethyl ketone. The reaction mixture is applied by drawbar to a float glass plate at a wet film thickness of 12 mils (about 0.3 millimeters), dried in air at ambient temperature for 30 minutes, and cured at 250° F. (about 121° C.) for one hour. The coated glass is soaked in warm water to loosen the film, which is then peeled from the glass. The film is assembled into a unit comprising a primed glass substrate, an energy-absorbing thermoplastic innerlayer and the film. In this example, the substrate is SOLEX tinted glass, primed with a 10 percent solution of AP-134 primer, commercially available from Lord Corp., in methyl ethyl ketone. The innerlayer is a 20 mil (about 0.5 millimeter) thick sheet of polyurethane. The unit is laminated at 300° F. (about 149° C.) and 200 pounds per square inch pressure for 45 minutes. After cooling to ambient temperature, the laminate, having the film of this example as the exposed surface, is subjected to solvent/abrasion testing using the sled abrader described herein. The film exhibits somewhat better abrasion resistance to acetone and substantially better abrasion resistance to isopropanol compared with the polyurethane innerliner uncoated.

EXAMPLE II

A polyester-based polyurethane is prepared from a reaction mixture comprising 97.0 grams of poly (neopentyl glycol adipate). 32.1 grams of the polyisocyanate of Example I and 10.2 grams of the catalyst solution of Example I. The polyol of this example has an OH value of 56.1 and is available as Formrez F20-30 from Witco Chemical. The reaction mixture is applied by drawknife to a float glass plate at a wet film thickness of 12 miles (0.3 millimeter) and cured for 3 hours at 250° F. (about 121° C.). The film is removed from the glass and laminated with a thermoplastic, energy-absorbing polyurethane innerlayer on a glass substrate as in Example I. Abrasion-testing yields similar results.

EXAMPLE III

A polyurethane is prepared from a polycaprolactone polyol and an isocyanate prepolymer in this example. The polycaprolactone diol has a molecular weight of 830 and is commercially available as PCP-0210 from Union Carbide. The prepolymer is the reaction product of a polycaprolactone triol and an aliphatic diisocyanate. The polycaprolactone triol has a molecular weight of 300 and is available as PCP 0301 from Union Carbide. The aliphatic isocyanate is methylene bis (cyclohexyl isocyanate) commercially available as Hylene W from Dupont. The prepolymer is prepared by mixing 675 grams of the triol and 1768.5 grams of the isocyanate in 1047.4 grams of methyl ethyl ketone containing 0.25 grams of dibutyltin dilaurate catalyst. The mixture is heated at 80° C. until an isocyanate equivalent weight of 578 is reached. The prepolymer is 71 percent solids. A reaction mixture comprising 74.07 grams of this prepolymer, 53.36 grams of PCP-0210 and 5.1 grams of the catalyst solution of the previous examples is applied by drawknife to a glass substrate at a wet film thickness of 12 mils (0.3 millimeter) and cured for one hour at 250° F. (about 121° C.). This polyurethane has a urethane content of 15.1 weight percent, a nitrogen content of 3.6 percent, and a crosslink density of 2500. The film is laminated and tested as in the previous examples. The abrasion resistance in isopropanol is significantly better than the previous examples, and the abrasion resistance in acetone is remarkably better. Overall results are excellent.

EXAMPLE IV

A polyurethane is prepared from a polyhexanediol adipate and the isocyanate prepolymer of Example III from a reaction mixture comprising 50.43 grams of the prepolymer, 79.56 grams of polyol and 10.2 grams of the catalyst solution of the previous examples. The polyol has a molecular weight of 1000 and is commercially available as Formrez F13-35 from Witco Chemical. The reaction mixture is applied by drawknife to a float glass substrate at a wet film thickness of 15 mils (about 0.4 millimeter) and cured for 5 hours at 250° F. (about 121° C.). The film is laminated and tested as in the previous examples with similar excellent results.

EXAMPLE V

A polyurethane is prepared from a polycaprolactone diol and an isocyanate prepolymer as follows. The polycaprolactone diol has a molecular weight of 530 and is commercially available as PCP-0200 from Union Carbide. The isocyanate prepolymer is the reaction product of a polycaprolactone triol and an aliphatic diisocyanate. The polycaprolactone triol has a molecular weight of 900 and is commercially available as PCP-0310 from Union Carbide. The aliphatic isocyanate is methylene bis (cyclohexyl isocyanate) as in Example III. A reaction mixture comprising 1350 grams of the polyol, 1179 grams of the isocyanate and 0.26 grams of dibutyltin dilaurate in 1083.9 grams of methyl ethyl ketone is heated at 80° C. for 3 hours resulting in a resinous material with an NCO equivalent of 894 and 71.5 percent solids. A reaction mixture with an NCO-/OH ratio of 1.0 is prepared comprising 97.8 grams of the prepolymer, 29.0 grams of PCP-0200, 5.1 grams of the catalyst solution of the previous examples and an additional 10 grams of methyl ethyl ketone, and is applied by drawknife to a float glass substrate at a wet film thickness of 20 mils (about 0.5 millimeter). The film is cured for 4 hours at 250° F. (about 121° C.), laminated and tested as in the previous examples, with excellent results.

EXAMPLE VI

A polyurethane is prepared as in Example V except with an NCO/OH ratio of 1.05 from a reaction mixture comprising 102.7 grams of isocyanate prepolymer and 29.0 grams of polyol. The sample is applied, cured and tested as in Example V with comparable excellent results.

EXAMPLE VII

A polyurethane is prepared as in Examples V and VI except with an NCO/OH ratio of 0.95 from a reaction mixture comprising 92.8 grams of isocyanate prepolymer and 29.0 grams of polyol. The sample is applied, cured and tested as in the previous examples with comparable excellent results.

EXAMPLE VIII

A polyurethane is prepared from the isocyanate prepolymer of Example III and a polycaprolactone diol having a molecular weight of 1250. A reaction mixture having an NCO/OH ratio of 1.0 comprises 62.3 grams of prepolymer and 67.6 grams of polyol, and further comprises 5.1 grams of the catalyst solution of the previous examples. The mixture is applied and cured as in Example V, and laminated and tested as in the previous examples with good results.

EXAMPLE IX

A polyurethane is prepared as in the previous example, except with an NCO/OH ratio of 1.05, from a reaction mixture comprising 65.4 grams of isocyanate prepolymer, 67.6 grams of 1250 molecular weight polycaprolactone diol and 5.1 grams of catalyst solution. The reaction mixture is applied, cured, laminated and tested as in the previous examples with excellent results.

EXAMPLE X

A polyurethane is prepared as in the previous example, except with an NCO/OH ratio of 0.95, from a reaction mixture comprising 59.18 grams of isocyanate prepolymer, 67.6 grams of 1250 molecular weight polycaprolactone diol, 10.2 grams of catalyst solution and an additional 10 grams of methyl ethyl ketone. The sample is applied, dried, cured and tested as in the previous example with good results.

EXAMPLE XI

A polyurethane is prepared from the isophorone diisocyanate of Example I and a polycaprolactone diol of 2000 molecular weight. A reaction mixture comprising 98.7 grams of the isocyanate, 32.06 grams of the polyol, 5.1 grams of the catalyst solution of the previous examples and an additional 10 grams of methyl ethyl ketone is applied to a glass substrate, cured, removed, laminated to a glass/thermoplastic polyurethane bilayer and tested as in the previous examples, except that the glass substrate is coated with a silane release agent so that warm water soaking is not needed to remove the film. The abrasion resistance is good.

EXAMPLE XII

A polyurethane is prepared from a polycaprolactone diol having a molecular weight of 530 and a mixture of diisocyanate and triisocyanate. The polymer of this example further comprises an additive which absorbs ultraviolet radiation in order to protect the underlying thermoplastic from degradation, and an antioxidant. A reaction mixture comprising 70.45 grams of polyol, 42.14 grams of polyisocyanate of Example I, 17.44 grams of methylene bis(cyclohexyl isocyanate), 11 grams of 10% Tinuvin 770 in toluene, 11 grams of 10% Irganox 1035 in toluene, and 10.2 grams of the catalyst solution of the previous examples is applied to release coated glass, cured, removed, laminated to a thermoplastic polyurethane laminated to glass and tested as in the previous examples. Tinuvin 770 is a UV stabilizer and Irganox 1035 an antioxidant, both commercially available from Ciba-Geigy.

EXAMPLE XIII

A polyurethane is prepared from a polycaprolactone diol of molecular weight 530 and the isocyanate prepolymer of Example V with an NCO/OH ratio of 1.0, and further comprises the UV stabilizer and antioxidant of the previous example. A reaction mixture comprising 97.8 grams of isocyanate prepolymer, 29 grams of polyol, 10.2 grams of catalyst solution, 11 grams of 10% Tinuvin 770 in toluene and 11 grams of 10% Irganox 1035 in toluene is applied to release coated glass, cured, removed, laminated and tested as in the previous examples with good results.

EXAMPLE XIV

A polyurethane is prepared as in the previous example, except with an NCO/OH ratio of 1.05, from a reaction mixture comprising 102.7 grams of isocyanate prepolymer, 29 grams of polyol, 10.2 grams of catalyst solution, 11 grams of 10% Tinuvin 770 and 11 grams of 10% Irganox 1035. The reaction mixture is applied to release coated glass, cured, removed, laminated and tested as in the previous examples with good results.

EXAMPLE XV

A polyurethane coating is prepared from a polycaprolactone diol and an isocyanate-terminated prepolymer which is partially capped. The polycaprolactone diol has a molecular weight of 530 and the prepolymer is prepared as follows. An isocyanate terminated prepolymer is prepared as in Example V. A reaction mixture is prepared comprising 200 grams of the isocyanate-terminated prepolymer and 3.04 grams of methyl ethyl ketoxime. After reaction for 24 hours, the mixture has an isocyanate equivalent weight of 1173 and is partially capped. A polyurethane reaction mixture is prepared comprising 77 grams of the partially capped isocyanate-terminated prepolymer, 21.75 grams of the polycaprolactone diol, 8 grams of 10% Tinuvin 770 in toluene, 8 grams of 10% Irganox 1035 in toluene and 8 grams of 1% dibutyltin dilaurate catalyst solution in methyl ethyl ketone. The polyurethane reaction mixture is applied by drawknife to a float glass substrate at a wet coating thickness of 5 mils (about 0.13 millimeter), dried, cured, removed, laminated and tested as in the previous examples with good results.

EXAMPLE XVI

A polyurethane reaction mixture is prepared frm a polycaprolactone diol and an isocyanate prepolymer, and is diluted for application by spraying onto a surface of a 20 mil elastomeric polyurethane innerlayer which is subsequently laminated as in the previous examples. A polyurethane reaction mixture is prepared comprising 87 grams of polycaprolactone diol, 293.4 grams of isocyanate-terminated prepolymer, 1100 grams of diluent, 3 grams of Tinuvin 770, 3 grams of Irganox 1035, 6 grams of benzophenone and 0.3 grams of dibutyltin dilaurate catalyst. The polycaprolactone diol is PCP-0200 with a molecular weight of 530. The isocyanate-terminated prepolymer is prepared from 3363 grams of polycaprolactone triol, 2937 grams of methylene bis(cyclohexyl isocyanate) and 0.3 grams of dibutyltin dilaurate catalyst in 2700 grams of methyl ethyl ketone. The polycaprolactone triol is PCP-0310 with a molecular weight of 900. The prepolymer has an NCO equivalent weight of 809 and theoretically 70% solids. The diluent is a solvent mixture comprising 275 parts by weight methyl ethyl ketone, 275 parts by weight methyl isobutyl ketone, 275 parts by weight xylene and 275 parts by weight ethylene glycol monoethyl ether acetate. The dilute coating solution is spray applied to a surface of a polyurethane innerlayer and is cured for 16 hours at 175° F. (about 79° C.) to give a coating thickness of 0.9 mils. The coated polyurethane is then laminated on its uncoated surface to a glass substrate as in the previous examples, and subjected to abrasion testing as in the previous examples with excellent results.

EXAMPLE XVII

A bilayer windshield is coated with the polyurethane reaction mixture of Example XVI except with a coating thickness of 1.3 mils. The sample is subjected to abrasion testing as in the previous examples, again with excellent results.

EXAMPLE XVIII

A bilayer windshield is prepared as in the previous example and coated with the polyurethane mixture of Examples XVI and XVII, except with a coating thickness of 2.1 mils. The sample is subjected to abrasion testing as in the previous examples, again with excellent results.

EXAMPLE XIX

A polyurethane reaction mixture is prepared comprising 337.5 grams of the isocyanate-terminated prepolymer of Example XVII, 87 grams of polycaprolactone diol of molecular weight 530, and diluent comprising 4 parts methyl ethyl ketone, 4 parts xylene, 3 parts methyl isobutyl ketone and 3 parts ethylene glycol monoethyl ether acetate. The reaction mixture is sprayed onto a polyvinyl butyral sheet and cured for one hour at 225° F. (about 107° C.). The coated polyvinyl butyral is then laminated on its uncoated surface to a glass sheet under the laminating conditions of the previous examples. The coated sample is subjected to abrasion testing as in the previous examples with good results.

The abrasion testing results for all of the above examples are compared with the abrasion testing results of uncoated thermoplastic polyurethane, listed as Example 0, in the following table.

TABLE

| ABRASION RESISTANCE (HAZE RATING AFTER ABRASION IN SOLVENT) | | |
|---|---|---|
| EXAMPLE | ACETONE | ISOPROPANOL |
| 0 | 70 | 60 |
| I | 50 | 10 |
| II | 60 | 5 |
| III | 2 | 2 |
| IV | 3 | 5 |
| V | 1 | 1 |
| VI | 3 | 1 |
| VII | 3 | 4 |
| VIII | 5 | 15 |
| IX | 4 | 10 |
| X | 5 | 15 |
| XI | 5 | 15 |
| XII | 15 | 30 |
| XIII | 15 | 20 |
| XIV | 20 | 20 |
| XV | 15 | 15 |
| XVI | 5 | 10 |
| XVII | 3 | 10 |
| XVIII | 3 | 10 |
| XIX | 20 | 15 |

The above examples are offered to illustrate the present invention. While the above examples relate to a bilayer configuration comprising a single glass substrate, the solvent/abrasion-resistant coating of the present invention is equally useful on an antilacerative innerlayer of a conventional trilayer safety glass laminate. Various polyurethane compositions may be applied by a variety of conventional coating techniques to various elastomeric innerlayers. The thickness of abrasion-resistant coatings in accordance with the present invention range from a minimum determined by the ability to apply a uniform continuous film to a maximum determined by desired optical properties. The preferred range of 0.5 to 2 mils is determined by optimum abrasion resistance at minimum cost. Various additives such as UV absorbers and antioxidants may be employed in any amount which does not interfere with the abrasion-resistant properties of the coating, or may be incorporated into the elastomeric innerlayer instead. The scope of the present invention is defined by the following claims.

We claim:

1. An abrasion-resistant polyurethane coating composition comprising:
   a. a branched prepolymer having an isocyanate functionality greater that 2; and
   b. a hydroxy-terminated linear polymeric polyol selected from the group consisting of polyethers and polyesters having a molecular weight between 300 and 5,000.

2. An abrasion-resistant polyurethane coating composition according to claim 1, wherein said hydroxy-terminated polyol is a diol.

3. An abrasion-resistant polyurethane coating composition according to claim 2, wherein said diol is a polyether diol.

4. An abrasion-resistant polyurethane coating composition according to claim 3, wherein said polyether diol is polytetramethylene ether glycol.

5. An abrasion-resistant polyurethane coating composition according to claim 2, wherein said diol is a poyester diol.

6. An abrasion-resistant polyurethane coating composition according to claim 5, wherein said polyester diol is a polycaprolactone diol.

7. An abrasion-resistant polyurethane coating composition according to claim 1, wherein said branched prepolymer is an isocyanate-terminated prepolymer reaction product of a diisocyanate and a triol.

8. An abrasion-resistant polyurethane coating composition according to claim 7, wherein said isocyanate-terminated prepolymer is the reaction product of a diisocyanate selected from the group consisting of isophorone diisocyanate and methylene bis(cyclohexyl isocyanate).

9. An abrasion-resistant polyurethane coating composition according to claim 8, wherein said isocyanate-terminated prepolymer is the reaction product of a diisocyanate with trimethylol propane.

10. An abrasion-resistant polyurethane coating composition according to claim 1, further comprising ultraviolet light absorbing compound and antioxidant compound.

* * * * *